United States Patent
Iino et al.

(10) Patent No.: US 11,964,536 B2
(45) Date of Patent: Apr. 23, 2024

(54) VEHICULAR HEAT EXCHANGE SYSTEM AND MOTOR UNIT USED IN SAME

(71) Applicants: SANDEN AUTOMOTIVE CLIMATE SYSTEMS CORPORATION, Isesaki (JP); NIDEC CORPORATION, Kyoto (JP)

(72) Inventors: Yusuke Iino, Isesaki (JP); Osamu Takazawa, Isesaki (JP); Yurio Nomura, Kyoto (JP)

(73) Assignees: SANDEN CORPORATION, Isesaki (JP); NIDEC CORPORATION, Kyoto (JP)

( * ) Notice: Subject to any disclaimer, the term of this patent is extended or adjusted under 35 U.S.C. 154(b) by 542 days.

(21) Appl. No.: 17/272,608

(22) PCT Filed: Sep. 17, 2019

(86) PCT No.: PCT/JP2019/036377
§ 371 (c)(1),
(2) Date: Mar. 1, 2021

(87) PCT Pub. No.: WO2020/059712
PCT Pub. Date: Mar. 26, 2020

(65) Prior Publication Data
US 2021/0197644 A1 Jul. 1, 2021

(30) Foreign Application Priority Data
Sep. 18, 2018 (JP) .................... 2018-174196

(51) Int. Cl.
*B60H 1/00* (2006.01)
*B60H 1/32* (2006.01)

(52) U.S. Cl.
CPC ....... *B60H 1/00328* (2013.01); *B60H 1/3204* (2013.01)

(58) Field of Classification Search
CPC .............. B60H 1/00328; B60H 1/3204; B60H 1/00278; B60H 1/00499; B60H 1/143;
(Continued)

(56) References Cited

U.S. PATENT DOCUMENTS 5,878,589 A 3/1999 Tanaka et al.
9,855,821 B2 * 1/2018 Kang ................. B60H 1/00921
(Continued)

FOREIGN PATENT DOCUMENTS

DE 10 2013 225 582 A1 6/2015
JP H09-290622 A 11/1997
(Continued)

OTHER PUBLICATIONS

English translation of Ono (JP 2015182487 A). (Year: 2015).*
(Continued)

*Primary Examiner* — Miguel A Diaz
(74) *Attorney, Agent, or Firm* — Baker Botts L.L.P.

(57) ABSTRACT

There are included a first heat exchanger (42) for causing heat to be exchanged between refrigerant and air in an interior of a vehicle (1), a heating circuit (36) for causing the refrigerant with a temperature higher than that of the air in the interior of the vehicle to circulate through the first heat exchanger, a secondary battery (21) where charging and discharging of power are performed, a cooling water circuit (50) for causing cooling water that exchanges heat with the secondary battery to circulate, a second heat exchanger (61) for causing heat to be exchanged between the refrigerant and the cooling water, the second heat exchanger being provided in a manner including a portion of the heating circuit downstream of the first heat exchanger and a portion of the cooling water circuit, and a case (23) for covering the secondary battery, the cooling water circuit, and the second heat exchanger.

4 Claims, 3 Drawing Sheets

(58) Field of Classification Search
CPC .............. B60H 1/3228; B60H 1/32281; B60H 1/32284; B60H 1/3229; B60H 2001/00928
See application file for complete search history.

(56) References Cited

U.S. PATENT DOCUMENTS

| | | | |
|---|---|---|---|
| 11,214,116 B2 * | 1/2022 | Kim | ..................... H01M 10/625 |
| 2015/0174986 A1 * | 6/2015 | Satzger | .............. B60H 1/00314 165/41 |
| 2015/0295285 A1 * | 10/2015 | Takeuchi | ................... B60L 1/02 62/498 |
| 2016/0107502 A1 * | 4/2016 | Johnston | ............ B60H 1/00921 165/202 |
| 2017/0021698 A1 | 1/2017 | Hatakeyama et al. | |
| 2018/0072130 A1 | 3/2018 | Kim | |
| 2019/0135075 A1 * | 5/2019 | Hwang | .............. B60H 1/00278 |
| 2021/0190389 A1 * | 6/2021 | Tada | ........................ F25B 41/20 |
| 2023/0020602 A1 * | 1/2023 | Lee | ...................... B60H 1/3213 |

FOREIGN PATENT DOCUMENTS

| | | | | |
|---|---|---|---|---|
| JP | 2012-236577 A | 12/2012 | | |
| JP | 2014-226962 A | 12/2014 | | |
| JP | 2015-182487 A | 10/2015 | | |
| JP | 2015-186989 A | 10/2015 | | |
| JP | 6075058 B2 * | 2/2017 | ......... B60H 1/00278 |
| JP | 2018-043741 A | 3/2018 | | |
| WO | 2012/114439 A1 | 8/2012 | | |
| WO | 2014/103234 A1 | 7/2014 | | |
| WO | WO-2019150829 A1 * | 8/2019 | | |
| WO | WO-2020050040 A1 * | 3/2020 | .............. F25B 13/00 |
| WO | WO-2022181110 A1 * | 9/2022 | | |

OTHER PUBLICATIONS

Japan Patent Office, Notice of Reasons for Refusal issued in Japanese Patent Application No. 2020-548515, dated Aug. 2, 2023.
Japan Patent Office, International Search Report issued in International Application No. PCT/JP2019/036377, dated Oct. 21, 2019.
German Patent and Trade Mark Office, Office Action issued in German Patent Application No. 11 2019 004 660.8, dated Apr. 19, 2023.
Japan Patent Office, Notice of Reasons for Refusal issued in Japanese Patent Application No. 2020-548515, dated Jan. 10, 2024 (10 pages).

* cited by examiner

VEHICULAR HEAT EXCHANGE SYSTEM AND MOTOR UNIT USED IN SAME

This application is a U.S. National Stage Patent Application under 35 U.S.C. § 371 of International Patent Application No. PCT/JP2019/036377, filed on Sep. 17, 2019, which claims the benefit of Japanese Patent Application No. 2018-174196, filed on Sep. 18, 2018, the disclosures of each of which are incorporated herein by reference in their entirety.

TECHNICAL FIELD

The present invention relates to a vehicular heat exchange system, and more particularly, to a technique of reducing heat loss during heat exchange.

BACKGROUND ART

These days, electric vehicles that are equipped with an electric motor and a battery (a secondary battery) for supplying power to the electric motor and that travel by causing the electric motor to be driven are becoming widespread, replacing vehicles that include an internal combustion engine as a drive source.

With such an electric vehicle, the interior of the vehicle cannot be heated using heat that is generated by the internal combustion engine, and thus, the interior of the vehicle is heated by heating refrigerant by causing the refrigerant to circulate while being subjected to compression, heat exchange and expansion, for example.

However, there is a problem that causing refrigerant to circulate in the above manner consumes power. Such power consumption reduces the driving range of the vehicle and thus is not desirable.

Accordingly, a technique is being developed, according to a heat exchanger for exchanging heat between refrigerant and cooling water for adjusting the temperature of a battery being provided on a passage where the refrigerant is caused to circulate, the technique being that the refrigerant is heated using heat that is generated by charging/discharging of the battery to thereby reduce the power that is consumed to heat the refrigerant (Patent Document 1).

PRIOR ART DOCUMENT

Patent Document

Patent Document 1: International Publication No. WO 2012/114439

SUMMARY OF THE INVENTION

Problems to be Solved by the Invention

However, with the technique disclosed in the above Patent Document 1, heat is possibly radiated outside the vehicle from the passage where the cooling water circulates and the heat exchanger that exchanges heat between the cooling water and the refrigerant, and the technique leaves room for further improvement.

The present invention has been made in view of the above circumstances, and an object thereof is to provide a vehicular heat exchange system that is capable of reducing heat loss by suppressing radiation of heat outside a vehicle from a circuit where cooling water circulates and a heat exchanger that exchanges heat between the cooling water and refrigerant.

Means for Solving the Problems

In order to achieve the above object, a vehicular heat exchange system of the present invention includes a first heat exchanger for causing heat to be exchanged between refrigerant and air in an interior of a vehicle; a heating circuit for causing the refrigerant with a temperature higher than that of the air in the interior of the vehicle to circulate through the first heat exchanger; a secondary battery where charging and discharging of power are performed; a cooling water circuit for causing cooling water that exchanges heat with the secondary battery to circulate; a second heat exchanger for causing heat to be exchanged between the refrigerant and the cooling water, the second heat exchanger being provided in a manner including a portion of the heating circuit downstream of the first heat exchanger and a portion of the cooling water circuit; and a case for covering the secondary battery, the cooling water circuit, and the second heat exchanger.

Advantageous Effects of the Invention

With the vehicular heat exchange system of the present invention, radiation of heat outside the vehicle from the circuit where the cooling water circulates and the heat exchanger that exchanges heat between the cooling water and the refrigerant may be suppressed and heat loss may be reduced, and heat generated by the secondary battery may be effectively used.

MODE FOR CARRYING OUT THE INVENTION

Hereinafter, an embodiment of the present invention will be described with reference to the drawings.

Figure 1:
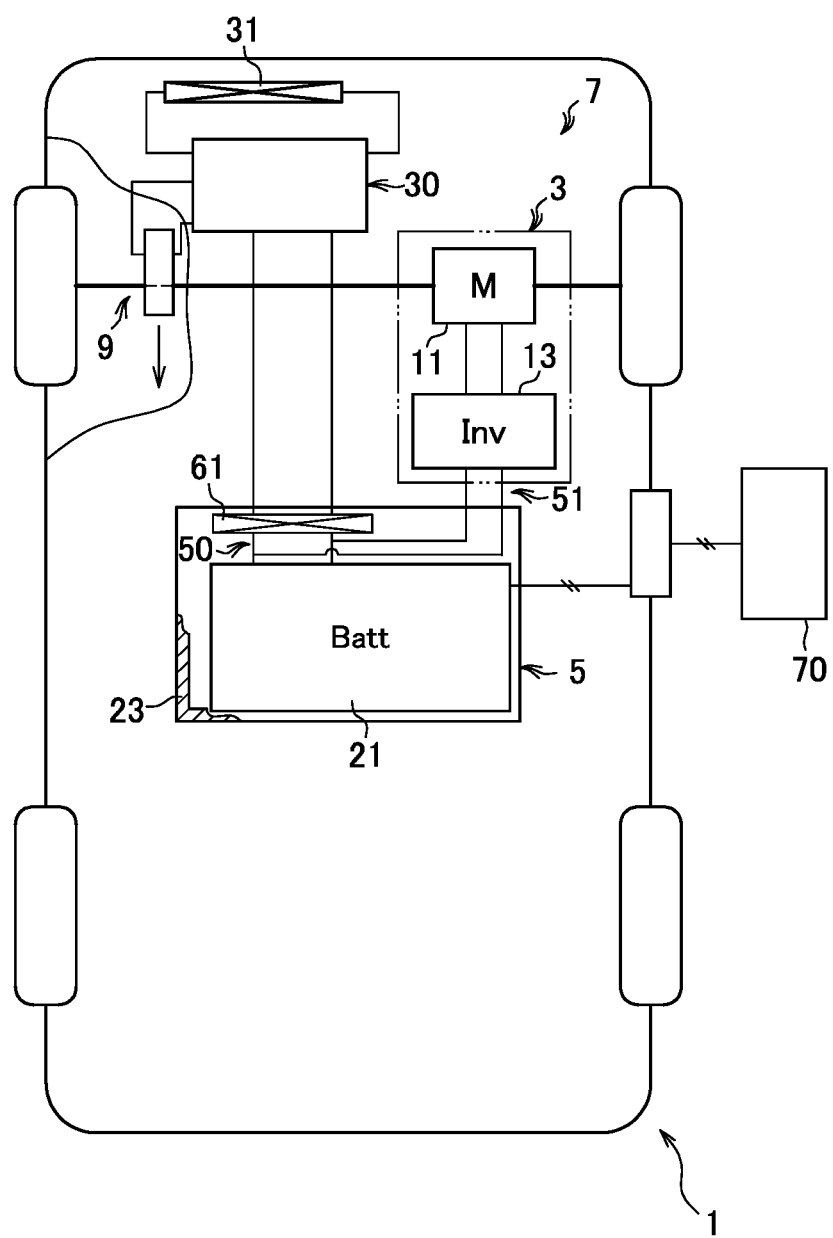
FIG. 1 is a schematic configuration diagram of a vehicle that is equipped with a vehicular heat exchange system according to the present invention.

Referring to FIG. 1, FIG. 1 shows a schematic configuration diagram of a vehicle 1 that is equipped with a vehicular heat exchange system 7 according to the present invention.

The vehicle 1 is an electric vehicle that is capable of traveling by driving a motor 11. Accordingly, the vehicle 1 is equipped with a motor unit 3 and a battery unit 5 for supplying power to the motor unit 3.

The motor unit 3 includes the motor 11 and an inverter 13, and is capable of driving the motor 11 by converting DC power supplied from a battery (a secondary battery) 21 of the battery unit 5 into three-phase AC power by the inverter 13, for example. The battery unit 5 includes the battery 21 and a case 23. For example, the battery 21 is a secondary battery that includes lithium ions. The case 23 is an aluminum housing that covers the battery 21, for example, and a thermal insulator is provided between the case 23 and the battery 21.

The vehicle 1 is equipped with the vehicular heat exchange system 7 according to the present invention, and the vehicular heat exchange system 7 includes a heat pump system 30, an air-conditioning unit 9, the motor unit 3, and the battery unit 5.

Figure 2:
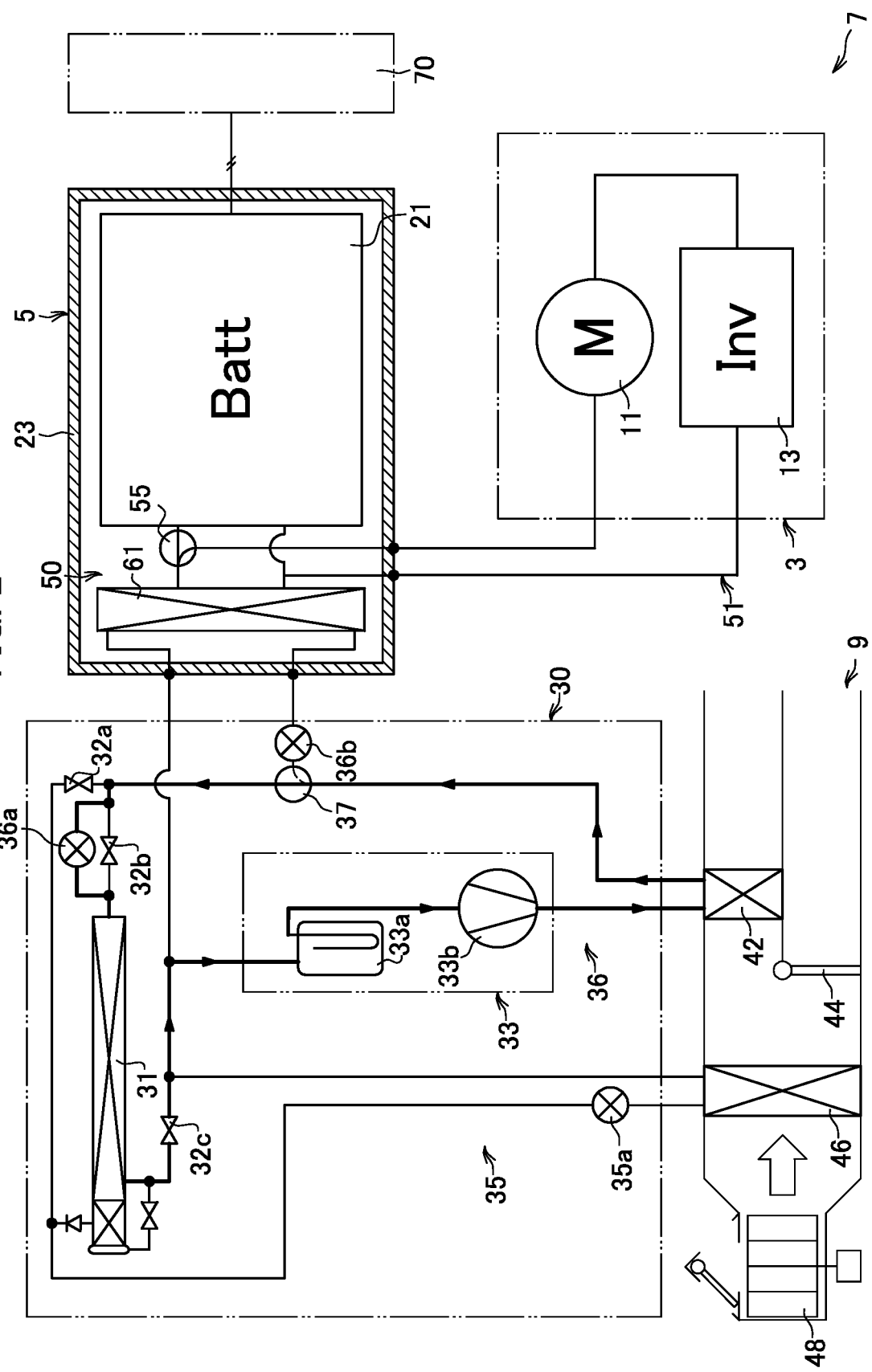
FIG. 2 is a circuit diagram of the vehicular heat exchange system according to the present invention in a normal heating cycle.

Referring to FIG. 2, FIG. 2 is a circuit diagram of the vehicular heat exchange system 7 according to the present invention. Additionally, FIG. 2 shows a state of a circuit when the vehicular heat exchange system 7 is in a normal heating cycle.

As shown in the drawing, the circuit of the vehicular heat exchange system 7 includes the heat pump system 30, a battery cooling circuit (a cooling water circuit) 50, and a motor-unit cooling circuit 51. Refrigerant is to circulate through the heat pump system 30. The heat pump system 30 includes an exterior heat exchanger (a third heat exchanger) 31 and a compression circuit 33, and may form a heating circuit 36 and a cooling circuit 35 including the exterior heat exchanger 31 and the compression circuit 33. The heat pump system 30 includes on-off valves 32a, 32b, 32c that enable switching of a flow of the refrigerant, and switching between the heating circuit 36 and the cooling circuit 35 is enabled by opening or closing the on-off valves 32a, 32b, 32c as appropriate.

The exterior heat exchanger 31 is a heat exchanger that is capable of causing heat to be exchanged between air outside the vehicle 1 (outside air) and the refrigerant flowing through the heat pump system 30. For example, the exterior heat exchanger 31 is disposed on a front side of the vehicle 1 to allow heat to be caused to be efficiently exchanged between the refrigerant and wind that is created due to traveling of the vehicle 1 or driving of a fan, not shown, in other words, flowing air.

The compression circuit 33 includes an accumulator 33a and a compressor 33b. The accumulator 33a is a separator that separates, from vaporized refrigerant, refrigerant that is not fully evaporated. The compressor 33b is a compressor that operates to compress and liquefy the vaporized refrigerant into liquefied refrigerant and to heat the refrigerant.

The heating circuit 36 includes a three-way valve 37, a first expansion valve 36a, a second expansion valve 36b, the exterior heat exchanger 31, the compression circuit 33, and an indoor condenser (a first heat exchanger) 42 of the air-conditioning unit 9 that are connected in a manner allowing the refrigerant to flow through. The first expansion valve 36a and the second expansion valve 36b are so-called expansion valves that expand the refrigerant that is flowing through into the vaporized refrigerant in the form of wet steam and cool the refrigerant.

The cooling circuit 35 includes the three-way valve 37, the exterior heat exchanger 31, a third expansion valve 35a, an evaporator 46 of the air-conditioning unit 9, and the compression circuit 33 that are connected in a manner allowing the refrigerant to flow through. Like the first expansion valve 36a and the second expansion valve 36b, the third expansion valve 35a is a so-called expansion valve that expands the refrigerant that is flowing through into the vaporized refrigerant in the form of wet steam and cools the refrigerant.

The air-conditioning unit 9 is a device that sends air into an interior of the vehicle 1 by a fan 48, and the indoor condenser 42, the evaporator 46 and an air-mix door 44 of the heat pump system 30 are provided inside the air-conditioning unit 9. The air-conditioning unit 9 may thus cause air that is suctioned from the interior of the vehicle to flow through the indoor condenser 42 by switching the air-mix door 44 and cause heat to be exchanged between the refrigerant and the air by the indoor condenser 42, and may heat the interior of the vehicle by sending heated air into the interior of the vehicle. Furthermore, the air-conditioning unit 9 may cause the air that is suctioned from the interior of the vehicle to flow through the evaporator 46 and cause heat to be exchanged between the refrigerant and the air by the evaporator 46, and may cool the interior of the vehicle by sending cooled air into the interior of the vehicle.

The battery cooling circuit 50 is a cooling circuit that is provided in the battery unit 5. The motor-unit cooling circuit 51 that is a cooling circuit provided in the motor unit 3 is connected to the battery cooling circuit 50 in parallel. Furthermore, a switching valve 55 is provided at a branch point where the battery cooling circuit 50 and the motor-unit cooling circuit 51 are connected.

The switching valve 55 may cause cooling water to circulate on the battery 21 side by being opened on the battery cooling circuit 50 side, and may cause the cooling water to circulate on the motor unit 3 side by being opened on the motor-unit cooling circuit 51 side, or may be opened to cause the cooling water to circulate on both sides.

A water-refrigerant heat exchanger (a second heat exchanger) 61 is provided between the heat pump system 30 and the battery cooling circuit 50 in a manner including a portion of the heat pump system 30 downstream of the indoor condenser 42 and a portion of the battery cooling circuit 50.

The water-refrigerant heat exchanger 61 is a heat exchanger that is capable of exchanging heat between the refrigerant flowing through the heat pump system 30 and the cooling water flowing through the battery cooling circuit 50 and the motor-unit cooling circuit 51. The temperature of the battery 21 may be thus adjusted by causing the cooling water to circulate between the battery 21 and the water-refrigerant heat exchanger 61. The water-refrigerant heat exchanger 61 is disposed inside the case 23 of the battery unit 5.

In the following, operation of the vehicular heat exchange system 7 configured in the above manner will be described.

<Cooling>

At the time of cooling, in other words, when the heat pump system 30 is in a cooling cycle, the cooling circuit 35 is formed by closing the on-off valves 32a, 32c and opening the on-off valve 32b, and the interior of the vehicle is thus cooled by the evaporator 46 as described above.

<Normal Heating>

At the time of normal heating, in other words, when the heat pump system 30 is in a normal heating cycle, the heating circuit 36 is formed by closing the on-off valves 32a, 32b and opening the on-off valve 32c, as shown in FIG. 2. Then, the three-way valve 37 is opened such that the liquefied refrigerant may be caused to flow from the indoor condenser 42 to the exterior heat exchanger 31.

Thus, in the heating circuit 36, the first expansion valve 36a expands the liquefied refrigerant into the vaporized refrigerant and cools the refrigerant, and the exterior heat exchanger 31 heats the vaporized refrigerant by absorbing heat from the outside air. Then, in the heating circuit 36, the compression circuit 33 compresses the vaporized refrigerant into the liquefied refrigerant and heats the refrigerant, the indoor condenser 42 heats air by causing heat to be exchanged between the liquefied refrigerant and air in the interior of the vehicle, and the liquefied refrigerant is caused to flow through the first expansion valve 36a again. The interior of the vehicle is normally heated by repeatedly exchanging heat using the refrigerant in the above manner.

<Using Residual Heat>

The vehicle 1 according to the present embodiment is an electric vehicle, and thus, the battery 21 needs to be charged before traveling. For example, it is conceivable that the vehicle 1 is connected to a charger 70 and is charged during being parked after traveling to prepare for next traveling. At this time, the battery 21 generates heat by being charged. However, the battery 21 is covered by the case 23, and heat from the battery unit 5 (residual heat of the battery) is not easily discharged. The vehicular heat exchange system 7 is capable of using such residual heat of the battery to heat the vehicle 1 at the time of start of traveling of the vehicle 1.

Figure 3:
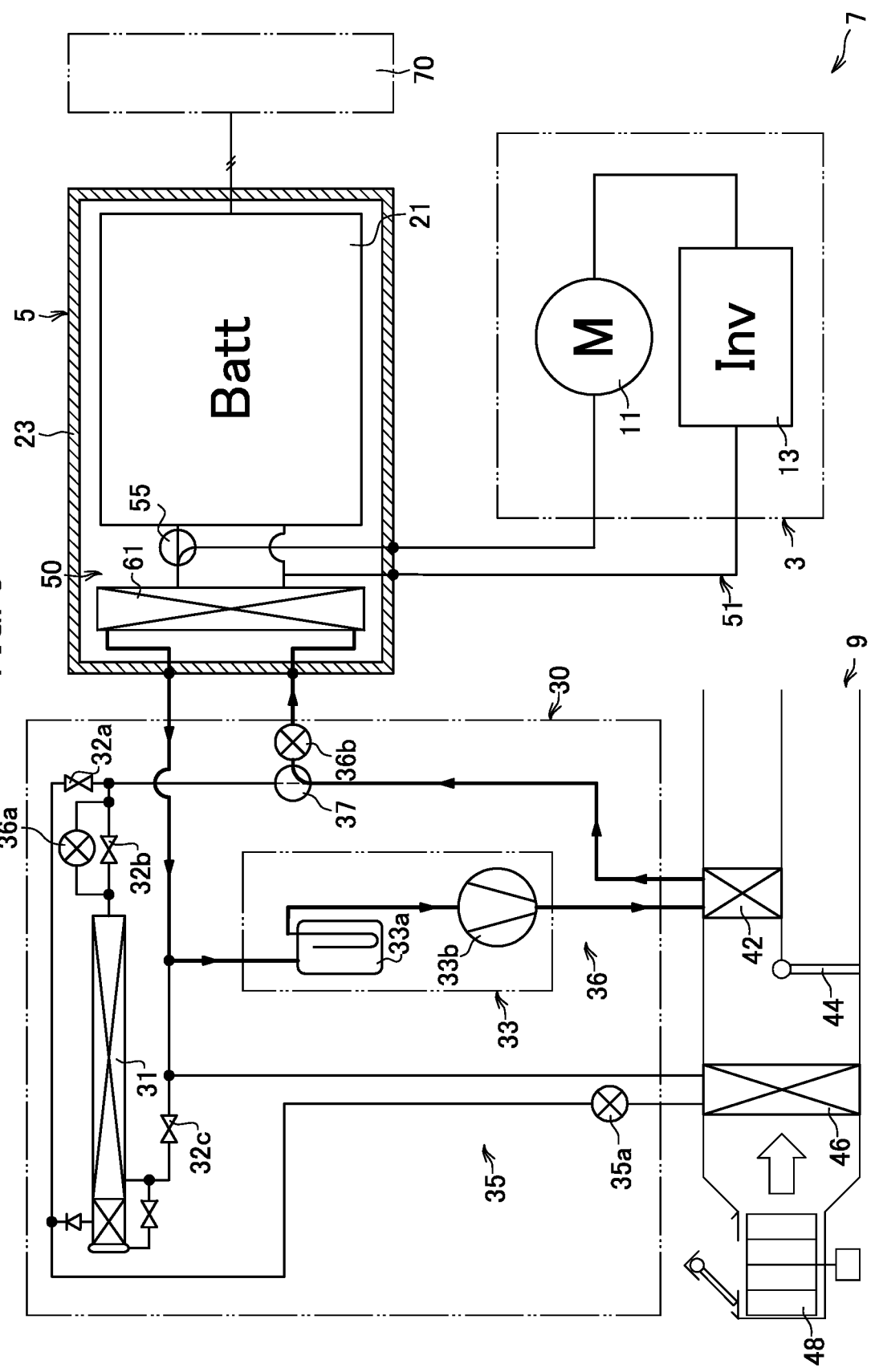
FIG. 3 is a circuit diagram of the vehicular heat exchange system according to the present invention at the time of use of residual heat of a battery.

Referring to FIG. 3, FIG. 3 shows a state of the circuit when the heat pump system 30 is using the residual heat of the battery. At the time of use of the residual heat of the battery, the heating circuit 36 is formed by closing all the on-off valves 32a, 32b, 32c and opening the three-way valve 37 such that the liquefied refrigerant may be caused to flow from the indoor condenser 42 to the second expansion valve 36b.

In this case, in the heating circuit 36, the second expansion valve 36b expands the liquefied refrigerant into the vaporized refrigerant and cools the refrigerant, and the vaporized refrigerant is caused to flow through the water-refrigerant heat exchanger 61.

At the time of use of the residual heat of the battery, the switching valve 55 is switched to open on the battery cooling circuit 50 side, and the cooling water is thus caused to circulate on the battery 21 side. The cooling water flowing through the battery cooling circuit 50 is thus heated by the heat generated by the battery 21, and the temperature of the cooling water is increased.

Then, heat is exchanged, by the water-refrigerant heat exchanger 61, between the cooling water with the increased temperature flowing through the battery cooling circuit 50 and the refrigerant flowing inside the heat pump system 30. That is, the cooled vaporized refrigerant flowing into the water-refrigerant heat exchanger 61 is heated by absorbing heat from the cooling water with the increased temperature flowing through the battery cooling circuit 50. On the other hand, the cooling water flowing through the battery cooling circuit 50 is cooled, and the battery 21 is thereby cooled. Then, as in the case of normal heating, the refrigerant is heated by the compression circuit 33, heats air in the interior of the vehicle by exchanging heat with the air through the indoor condenser 42, and flows again to the second expansion valve 36b. In this manner, at the time of use of the residual heat of the battery, the interior of the vehicle may be effectively heated using the residual heat of the battery.

Furthermore, also during traveling of the vehicle 1, the motor 11 and the inverter 13 of the motor unit 3 generate heat, and the battery 21 also generates heat by being charged by regenerative operation of the motor 11. Accordingly, heat generated by the motor unit 3 may be used to heat the vehicle 1 also at times other than the start of traveling of the vehicle 1.

In this case, depending on the temperature and the like of each of the motor unit 3 and the battery unit 5, the switching valve 55 is switched to open only on the motor-unit cooling circuit 51 side or on the battery cooling circuit 50 side and the motor-unit cooling circuit 51 side, and causes the cooling water to flow to the motor 11 and the inverter 13 or to circulate through the motor 11 and the inverter 13 and on the battery 21 side. The cooling water flowing through the battery cooling circuit 50 is thereby heated by heat generated by the motor 11, the inverter 13 and the battery 21, and the temperature thereof is increased.

Then, heat is exchanged by the water-refrigerant heat exchanger 61 between the cooling water with the increased temperature flowing through the battery cooling circuit 50 and the motor-unit cooling circuit 51, and the refrigerant flowing inside the heat pump system 30, and the cooled vaporized refrigerant flowing into the water-refrigerant heat exchanger 61 is heated by absorbing heat from the cooling water with the increased temperature flowing through the battery cooling circuit 50 and the motor-unit cooling circuit 51. On the other hand, the cooling water flowing through the battery cooling circuit 50 and the motor-unit cooling circuit 51 is cooled, and the battery 21, the motor 11, and the inverter 13 are cooled. In this manner, also during traveling of the vehicle 1, the interior of the vehicle may be effectively heated using the residual heat of the motor unit 3 and the battery unit 5.

As described above, the vehicular heat exchange system 7 is capable of efficiently and effectively using the residual heat of the battery unit 5 and the motor unit 3 by exchanging heat between the refrigerant flowing inside the heat pump system 30 and the cooling water flowing through the battery cooling circuit 50 and the motor-unit cooling circuit 51 by using the water-refrigerant heat exchanger 61, and is also capable of appropriately preventing overheating of the battery 21, the motor 11, and the inverter 13.

As described above, in the present embodiment, the water-refrigerant heat exchanger 61 is disposed inside the case 23 of the battery unit 5. The battery cooling circuit 50 is also disposed inside the case 23 of the battery unit 5. Accordingly, heat may be directly exchanged between the refrigerant and the cooling water flowing through the water-refrigerant heat exchanger 61 and the battery cooling circuit 50 without the cooling water being cooled by the outside air.

In the following, operation and effects of a case where the water-refrigerant heat exchanger 61 is disposed inside the case 23 of the battery unit 5 will be described. Additionally, temperatures in the following description are merely examples.

For example, a case is assumed where the vehicle 1 is caused to be parked and is charged by the charger 70 for a long period of time (such as 7 hours) in a cold region where the outside air is −20° C. In this case, the air in the interior of the vehicle is cooled to −20° C. by the outside air. At this time, the heat pump system 30 and the motor unit 3 are also cooled to −20° C. by the outside air. However, the battery unit 5 generates heat by being charged by the charger 70, and the temperature thereof is higher than that of the outside air (at 27° C., for example).

In a case where the temperature of the interior of the vehicle falls below freezing point as in the case described above, a driver possibly heats the interior of the vehicle before getting in and causing the vehicle 1 to travel. At this time, if the interior of the vehicle is to be heated through normal heating by the vehicular heat exchange system 7, the temperature of the indoor condenser 42 may not be efficiently increased due to a difference in the temperature being small (for example, 8° C.) between the refrigerant in the exterior heat exchanger 31 and the outside air, and heating of the interior of the vehicle may take time.

On the other hand, if the interior of the vehicle is heated using the residual heat of the battery, a difference in the temperature between the refrigerant in the water-refrigerant heat exchanger 61 and the cooling water is great (for example, 55° C.), and thus, the temperature of the indoor condenser 42 may be efficiently increased, and the interior of the vehicle may be swiftly heated.

Here, assuming that the water-refrigerant heat exchanger 61 is disposed outside the case 23, the water-refrigerant heat exchanger 61 is cooled by the outside air and its temperature falls to −20° C., and the cooling water is cooled by the water-refrigerant heat exchanger 61. Therefore, by disposing the water-refrigerant heat exchanger 61 inside the case 23, the cooling water may be prevented from being cooled by the water-refrigerant heat exchanger 61.

Furthermore, because the second expansion valve 36b is disposed outside the case 23, the refrigerant is expanded and cooled by the second expansion valve 36b before flowing into the battery unit 5. Accordingly, the difference in the temperature between the refrigerant and the outside air may be made small from the time when the refrigerant leaves the second expansion valve 36b to the time when the refrigerant flows into the battery unit 5, even in a case where, for example, the temperature of the outside air (for example, −20° C.) is lower than the temperature of the refrigerant after the refrigerant is increased in temperature (to −11° C. or higher, for example) due to continuous heating of the interior of the vehicle and is then expanded and cooled (to −19° C., for example) by the second expansion valve 36b. Heat of the refrigerant may not be thus easily removed by the outside air.

As described above, the vehicular heat exchange system according to the present invention includes the indoor condenser 42 for causing heat to be exchanged between the refrigerant and the air in the interior of the vehicle 1, the heating circuit 36 for causing the refrigerant with a temperature higher than that of the air in the interior of the vehicle 1 to circulate through the indoor condenser 42, the battery 21 where charging and discharging of power are performed, the battery cooling circuit 50 for causing the cooling water that exchanges heat with the battery 21 to circulate, the water-refrigerant heat exchanger 61 for causing heat to be exchanged between the refrigerant and the cooling water, the water-refrigerant heat exchanger 61 being provided in a manner including a portion of the heating circuit 36 downstream of the indoor condenser 42 and a portion of the battery cooling circuit 50, and the case 23 for covering the battery 21, the battery cooling circuit 50, and the water-refrigerant heat exchanger 61.

Accordingly, because the water-refrigerant heat exchanger 61 that causes heat to be exchanged between the refrigerant and the cooling water is covered by the case 23, together with the battery 21 and the battery cooling circuit 50, heat of the cooling water may be prevented from being removed by the outside air at the water-refrigerant heat exchanger 61 and the battery cooling circuit 50. Heat loss may thus be reduced, and heat generated by the battery 21 may be effectively used.

There are also included the exterior heat exchanger 31 for causing heat to be exchanged between the refrigerant and air outside the vehicle 1, and the compressor 33b for compressing the refrigerant flowing from the exterior heat exchanger 31 and causing the refrigerant to flow through the indoor condenser 42. The heating circuit 36 is a heat exchange circuit where the exterior heat exchanger 31 causes heat to be exchanged between the refrigerant flowing from the indoor condenser 42 and the air outside the vehicle 1, and then, the compressor 33b compresses the refrigerant flowing from the exterior heat exchanger 31 and causes the refrigerant to flow through the indoor condenser 42, and the exterior heat exchanger 31 is connected in parallel with the water-refrigerant heat exchanger 61.

Accordingly, the refrigerant that is compressed by the compressor 33b to have a temperature higher than that of the air in the interior of the vehicle 1 is supplied to the indoor condenser 42 to be cooled by the air in the interior of the vehicle, and then, the three-way valve 37 may be selectively switched between causing the refrigerant to flow through the water-refrigerant heat exchanger 61 to exchange heat with the cooling water in the battery cooling circuit 50, or to flow through the exterior heat exchanger 31 to exchange heat with the air outside the vehicle 1.

Furthermore, there is also included the second expansion valve 36b for causing the refrigerant flowing from the indoor condenser 42 to the water-refrigerant heat exchanger 61 to be expanded, where the second expansion valve 36b is disposed outside the case 23. Accordingly, the refrigerant is expanded and cooled by the second expansion valve 36b, and is then caused to flow through the water-refrigerant heat exchanger 61, and heat of the refrigerant may thus be prevented from being removed by the outside air.

Moreover, there is also included the motor unit 3 that is driven by power that is supplied from the battery 21. The battery cooling circuit 50 includes the switching valve 55, and the switching valve 55 is opened to cause the cooling water to circulate at least on one of the battery 21 side and the motor unit 3 side.

Accordingly, for example, in a case where heat is generated by the motor unit 3 due to causing the vehicle 1 to travel before the heat pump system 30 and the battery unit 5 are sufficiently warmed and the like, and the temperature of the motor unit 3 becomes higher than the temperatures of the heat pump system 30 and the battery unit 5, the switching valve 55 may be switched to cause the cooling water to circulate on the motor unit 3 side to heat the cooling water, and the cooling water and the refrigerant may thereby be more desirably heated.

Moreover, the motor unit 3 is used in the vehicular heat exchange system 7 that includes the indoor condenser 42 for causing heat to be exchanged between the refrigerant and the air in the interior of the vehicle 1, the heating circuit 36 for causing the refrigerant with a temperature higher than that of the air in the interior of the vehicle 1 to circulate through the indoor condenser 42, and the battery 21 where charging and discharging of power are performed, where the vehicular heat exchange system 7 includes the case 23 and the switching valve 55, the case 23 being for covering the battery cooling circuit 50 for causing the cooling water that exchanges heat with the battery 21 to circulate, and the water-refrigerant heat exchanger 61 for causing heat to be exchanged between the refrigerant and the cooling water, the water-refrigerant heat exchanger 61 being provided in a manner including a portion of the heating circuit 36 downstream of the indoor condenser 42 and a portion of the battery cooling circuit 50, the switching valve 55 being opened to cause the cooling water to circulate at least on one of the battery 21 side and the motor unit 3 side, and the motor unit 3 heats the cooling water that is circulated through the motor unit 3 by opening of the switching valve 55, and causes the cooling water to be circulated through the water-refrigerant heat exchanger 61.

Accordingly, for example, in a case where heat is generated by the motor unit 3 due to causing the vehicle 1 to travel before the heat pump system 30 and the battery unit 5 are sufficiently warmed and the like, and the temperature of the motor unit 3 becomes higher than the temperatures of the heat pump system 30 and the battery unit 5, the switching valve 55 may be switched to cause the cooling water to circulate on the motor unit 3 side to heat the cooling water, and the motor unit may thereby more desirably heat the cooling water and the refrigerant.

The vehicular heat exchange system according to the present invention has been described above, but the present invention is not limited to the embodiment described above and may be changed within the scope of the invention.

For example, in the present embodiment, the heating circuit 36 is described to be a part of the heat pump system 30 including the compressor 33b and the exterior heat exchanger 31, but the heating circuit may alternatively heat the refrigerant by using a sheathed heater.

Furthermore, in the present embodiment, the heat pump system 30 is described by referring to the circuits in FIGS. 2 and 3, but the heat pump system 30 may have other circuit configurations so long as the indoor condenser 42 may be heated to heat the interior of the vehicle.

Furthermore, in the present embodiment, the battery unit 5 is described to include a thermal insulator between the battery 21 and the case 23, but instead, the case 23 itself may have a vacuum structure or a double structure.

A vehicular heat exchange system according to a first aspect of the present invention includes a first heat exchanger for causing heat to be exchanged between refrigerant and air in an interior of a vehicle, a heating circuit for causing the refrigerant with a temperature higher than that of the air in the interior of the vehicle to circulate through the first heat exchanger, a secondary battery where charging and discharging of power are performed, a cooling water circuit for causing cooling water that exchanges heat with the secondary battery to circulate, a second heat exchanger for causing heat to be exchanged between the refrigerant and the cooling water, the second heat exchanger being provided in a manner including a portion of the heating circuit downstream of the first heat exchanger and a portion of the cooling water circuit, and a case for covering the secondary battery, the cooling water circuit, and the second heat exchanger.

The vehicular heat exchange system according to a second aspect of the present invention may include a third heat exchanger for causing heat to be exchanged between the refrigerant and air outside the vehicle, and a compressor for compressing the refrigerant flowing from the third heat exchanger, and causing the refrigerant to flow through the first heat exchanger, where the heating circuit may be a heat exchange circuit where the third heat exchanger causes heat to be exchanged between the refrigerant flowing from the first heat exchanger and the air outside the vehicle, and then, the compressor compresses the refrigerant flowing from the third heat exchanger and causes the refrigerant to flow through the first heat exchanger, and the third heat exchanger may be connected in parallel with the second heat exchanger.

The vehicular heat exchange system according to a third aspect of the present invention may include an expansion valve for causing the refrigerant flowing from the first heat exchanger to the second heat exchanger to be expanded, where the expansion valve may be disposed outside the case.

The vehicular heat exchange system according to a fourth aspect of the present invention may include a motor unit that is driven by power that is supplied from the secondary battery, where the cooling water circuit may include a switching valve, and the switching valve may be opened to cause the cooling water to circulate at least on one of the secondary battery side and the motor unit side.

A vehicular heat exchange system according to a fifth aspect of the present invention is a motor unit that may be used in a vehicular heat exchange system including a first heat exchanger for causing heat to be exchanged between refrigerant and air in an interior of a vehicle, a heating circuit for causing the refrigerant with a temperature higher than that of the air in the interior of the vehicle to circulate through the first heat exchanger, and a secondary battery where charging and discharging of power are performed, where the vehicular heat exchange system may include a case and a switching valve, the case being for covering the secondary battery, a cooling water circuit for causing cooling water that exchanges heat with the motor unit to circulate, and a second heat exchanger for causing heat to be exchanged between the refrigerant and the cooling water, the second heat exchanger being provided in a manner including a portion of the heating circuit downstream of the first heat exchanger and a portion of the cooling water circuit, the switching valve being opened to cause the cooling water to circulate at least on one of the secondary battery side and the motor unit side, and the motor unit may heat the cooling water that is circulated through the motor unit by opening of the switching valve, and may supply the cooling water to the second heat exchanger.

EXPLANATION OF REFERENCE SIGNS 1 vehicle
7 vehicular heat exchange system
21 battery (secondary battery)
23 case
31 exterior heat exchanger (third heat exchanger)
33b compressor
36 heating circuit
36b second expansion valve (expansion valve)
42 indoor condenser (first heat exchanger)
50 battery cooling circuit (cooling water circuit)
55 switching valve
61 water-refrigerant heat exchanger (second heat exchanger)

The invention claimed is:
1. A vehicular heat exchange system comprising:
a first heat exchanger for causing heat to be exchanged between a refrigerant and air in an interior of a vehicle;
a heating circuit for causing the refrigerant with a temperature higher than a temperature of the air in the interior of the vehicle to circulate through the first heat exchanger;
a rechargeable battery where charging and discharging of power are performed;
a cooling water circuit for causing cooling water that exchanges heat with the rechargeable battery to circulate;
a second heat exchanger for causing heat to be exchanged between the refrigerant and the cooling water, the second heat exchanger being provided in a manner including a portion of the heating circuit downstream of the first heat exchanger and a portion of the cooling water circuit;
a case for covering the rechargeable battery, the cooling water circuit, and the second heat exchanger;
a third heat exchanger for causing heat to be exchanged between the refrigerant and air outside the vehicle; and
a compressor for compressing the refrigerant flowing from the third heat exchanger, and causing the refrigerant to flow through the first heat exchanger, wherein
the heating circuit is a heat exchange circuit where the third heat exchanger causes heat to be exchanged between the refrigerant flowing from the first heat exchanger and the air outside the vehicle, and then, the compressor compresses the refrigerant flowing from the third heat exchanger and causes the refrigerant to flow through the first heat exchanger, and
the third heat exchanger is connected in parallel with the second heat exchanger.

2. The vehicular heat exchange system according to claim 1, comprising an expansion valve for causing the refrigerant flowing from the first heat exchanger to the second heat exchanger to be expanded, wherein
   the expansion valve is disposed outside the case.

3. The vehicular heat exchange system according to claim 1, comprising a motor unit that is driven by power that is supplied from the rechargeable battery, wherein
   the cooling water circuit includes a switching valve, and
   the switching valve is opened to cause the cooling water to circulate at least on one of a rechargeable battery side and a motor unit side.

4. The vehicular heat exchange system according to claim 2, comprising a motor unit that is driven by power that is supplied from the rechargeable battery, wherein
   the cooling water circuit includes a switching valve, and
   the switching valve is opened to cause the cooling water to circulate at least on one of a rechargeable battery side and a motor unit side.

* * * * *